United States Patent [19]
Takasaki et al.

[11] Patent Number: 6,129,448
[45] Date of Patent: Oct. 10, 2000

[54] VEHICULAR LIGHTING FIXTURE WITH DISCHARGE BULB AND REFLECTOR HAVING INCREASED WIDTH AND DEPTH

[75] Inventors: Toshinobu Takasaki; Tomonori Aoyama, both of Shizuoka, Japan

[73] Assignee: Koito Manufacturing Co., Ltd., Tokyo, Japan

[21] Appl. No.: 08/774,083

[22] Filed: Dec. 23, 1996

[30] Foreign Application Priority Data

Dec. 25, 1995 [JP] Japan ................................. 7-337449

[51] Int. Cl.[7] ............................................... F21W 101/10
[52] U.S. Cl. ........................... 362/543; 362/544; 362/507
[58] Field of Search ................................... 362/543, 544, 362/546, 516, 507, 263

[56] References Cited

U.S. PATENT DOCUMENTS

| | | | |
|---|---|---|---|
| 4,513,357 | 4/1985 | Nieda et al. | 362/228 |
| 4,895,693 | 1/1990 | Suzuki et al. | 362/61 |
| 4,926,301 | 5/1990 | Liverance et al. | 362/61 |
| 4,937,710 | 6/1990 | Hurley et al. | 362/61 |
| 5,001,610 | 3/1991 | Otaka | 362/61 |
| 5,089,942 | 2/1992 | Sekiguchi | 362/61 |
| 5,119,275 | 6/1992 | Makita | 362/61 |
| 5,140,504 | 8/1992 | Sato | 362/61 |
| 5,195,815 | 3/1993 | Watanabe et al. | 362/61 |
| 5,228,766 | 7/1993 | Makita et al. | 362/61 |
| 5,343,370 | 8/1994 | Ohashi et al. | 362/61 |
| 5,453,902 | 9/1995 | Watanabe et al. | 362/61 |
| 5,546,284 | 8/1996 | Harada | 362/61 |
| 5,607,228 | 3/1997 | Ozaki et al. | 362/61 |
| 5,941,633 | 8/1999 | Saito et al. | 362/543 |

FOREIGN PATENT DOCUMENTS

| | | | |
|---|---|---|---|
| 2685439 | 6/1993 | France | F21M 3/02 |
| 4135020 | 6/1992 | Germany | F21M 7/00 |
| 4323991 | 1/1995 | Germany | F21M 3/16 |

*Primary Examiner*—Laura K. Tso
*Attorney, Agent, or Firm*—Sughrue, Mion, Zinn, Macpeak & Seas, PLLC

[57] ABSTRACT

A reflector (3) for a lamp LL having a discharge bulb (5) and a reflector (4) for a lamp HL having an incandescent bulb (6) are arranged so that the depth dimension of the rotary parabolic portion of the former reflector is set greater than that of the rotary parabolic portion of the latter reflector and that the opening dimension of the former reflector is widthwise greater than that of the opening dimension of the latter reflector. The effective reflection area of the reflector (3) is then increased and reflection efficiency is also increased when light from the discharge bulb (5) is reflected from the reflector (3).

8 Claims, 7 Drawing Sheets

VEHICULAR LIGHTING FIXTURE WITH DISCHARGE BULB AND REFLECTOR HAVING INCREASED WIDTH AND DEPTH

BACKGROUND OF THE INVENTION

1. Field of the Invention

The present invention relates to an automotive lighting fixture and more particularly a lighting fixture in which a lamp having a discharge bulb is integral with a lamp having an incandescent bulb.

2. Related Art

Application of lighting fixtures with a discharge bulb as a light source to automotive headlights is increasingly examined because such a discharge bulb has high luminescence efficiency, excellent color properties and a long life. However, a lighting fixture of the sort mentioned above needs a high voltage at which the discharge bulb causes electric discharge and a lighting circuit for raising a car battery voltage up to a desired level is required for the lighting fixture. Therefore, a lighting circuit unit forming a booster circuit, that is, a Starter circuit portion for raising the voltage up to the level required for the discharge bulb has been fitted integrally to part of a lighting fixture body.

In the case of a lighting fixture having combination structure in which a plurality of lamps are integrally installed, dimensions of reflectors and a lighting fixture body have been designed without consideration of the kinds of bulbs for use therein. When a headlight to be formed is of a combination lamp type wherein, for example, a lamp having a discharge bulb is used as a passing beam lamp (or low beam lamp) and a lamp having an incandescent bulb as a travel beam lamp (or high beam lamp), these lamps being integrally combined, the reflectors of the respective lamps are integrally formed in substantially the same dimension and contained in one lighting fixture body.

The reflectors of the respective lamps in such a conventional headlight have been formed in the same dimension and, though the luminance of the discharge bulb is extremely greater than that of the incandescent bulb, the luminous flux width of both of them is substantially the same because the reflective surfaces of the reflectors for the discharge and incandescent bulbs are similar. In consequence, a high degree of illumination is barely present at the peripheral portion of a light distribution area and the problem is that the light emission is not efficient. Light is particularly prevented by a shade in the passing beam lamp from being projected onto part of the area of the reflector, that is, the area where light is reflected upward in the reflector. Therefore, the effective area in which the reflector actually contributes to light reflection is much smaller than the whole area of the reflector and the amount of light irradiated by the passing beam lamp is small, thus reducing the visibility. In view of the fact that the use of passing beam lamps is continued while an automobile is traveling in urban districts, the reduced visibility is undesirable for safe driving.

Further, the heat produced by the discharge bulb is greater than that by the incandescent bulb in proportion to the luminance of the discharge bulb. Consequently, dissipation of the heat from the discharge bulb is required in consideration of the adverse influence of excessive heat on the reflector. However, no such measures have been taken so far. It should also be taken into consideration that the electromagnetic waves radiated from the discharge bulb affect a car radio and other electronic devices. Particularly, in a case where the lighting circuit for lighting the discharge bulb is arranged on the outer side of the lighting fixture body, the electromagnetic waves radiated from a lead connecting the lighting circuit and the discharge bulb are extremely strong and considerably affect electronic devices accordingly. As relatively large-sized electronic parts such as a booster transformer and capacitors are required in the lighting circuit, moreover, the whole lighting fixture also tends to become large-sized when the lighting circuit is attached to the outside of the lighting fixture body.

SUMMARY OF THE INVENTION

An object of the present invention is to provided a lighting fixture designed to increase visibility by improving the lighting efficiency of a lamp using a discharge bulb whilst taking measures against the effects of heat and radiated electromagnetic waves.

According to the present invention, a vehicular lighting fixture comprises a first reflector for the first lamp which has a depth dimension that is greater than the depth dimension of a second reflector for the second lamp, and the mouth opening dimension of the first reflector is, widthwise, greater than the widthwise mouth opening dimension of the second reflector.

The lighting fixture will normally have a lighting circuit for use in lighting the discharge bulb. This lighting circuit is preferably arranged under a flat portion of the underside of a lighting fixture body containing the first lamp and the second lamp, or otherwise at the rear of the lighting fixture body behind the second lamp.

A shielding plate made of conductive material may be provided around the discharge bulb.

It is also preferred that a thick edge portion is formed at the front of the mouth opening of the reflectors.

A lens provided in front of the lamps is preferably tilted so that an upper portion of the lens is positioned forwards further than the lower portion thereof; and that the reflector for each lamp is positioned so that the front upper edge portion of the reflector projects forwards further than the lower edge portion thereof.

BRIEF DESCRIPTION OF THE DRAWING FIGURES

DETAILED DESCRIPTION OF THE PREFERRED EMBODIMENTS

Figure 1:
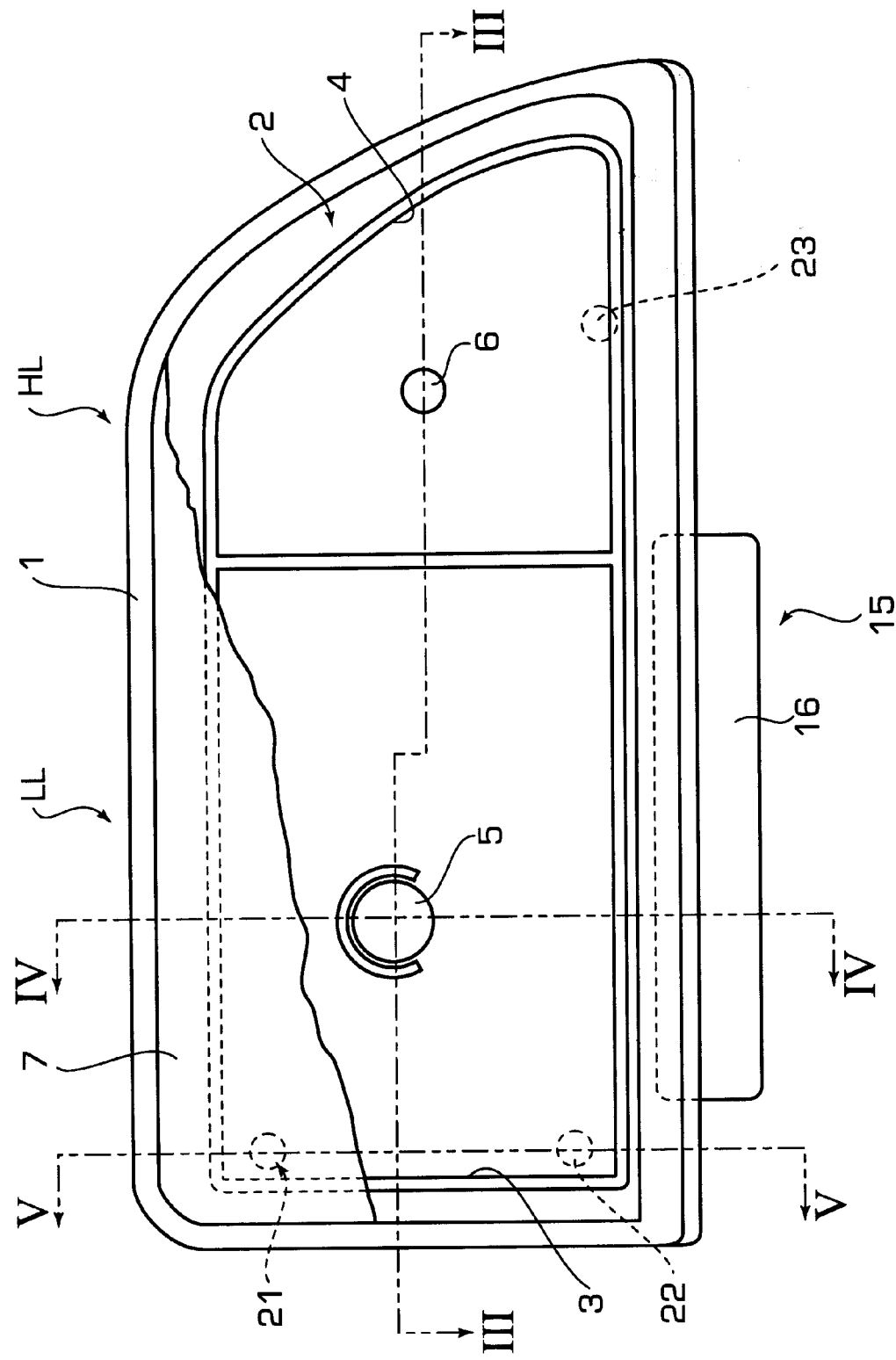
FIGS. 1 and 2 are a partially cutaway elevational view and a rear elevational view, respectively, of an embodiment of the present invention applied to four-lamp type headlights of an automobile.
Figure 2:
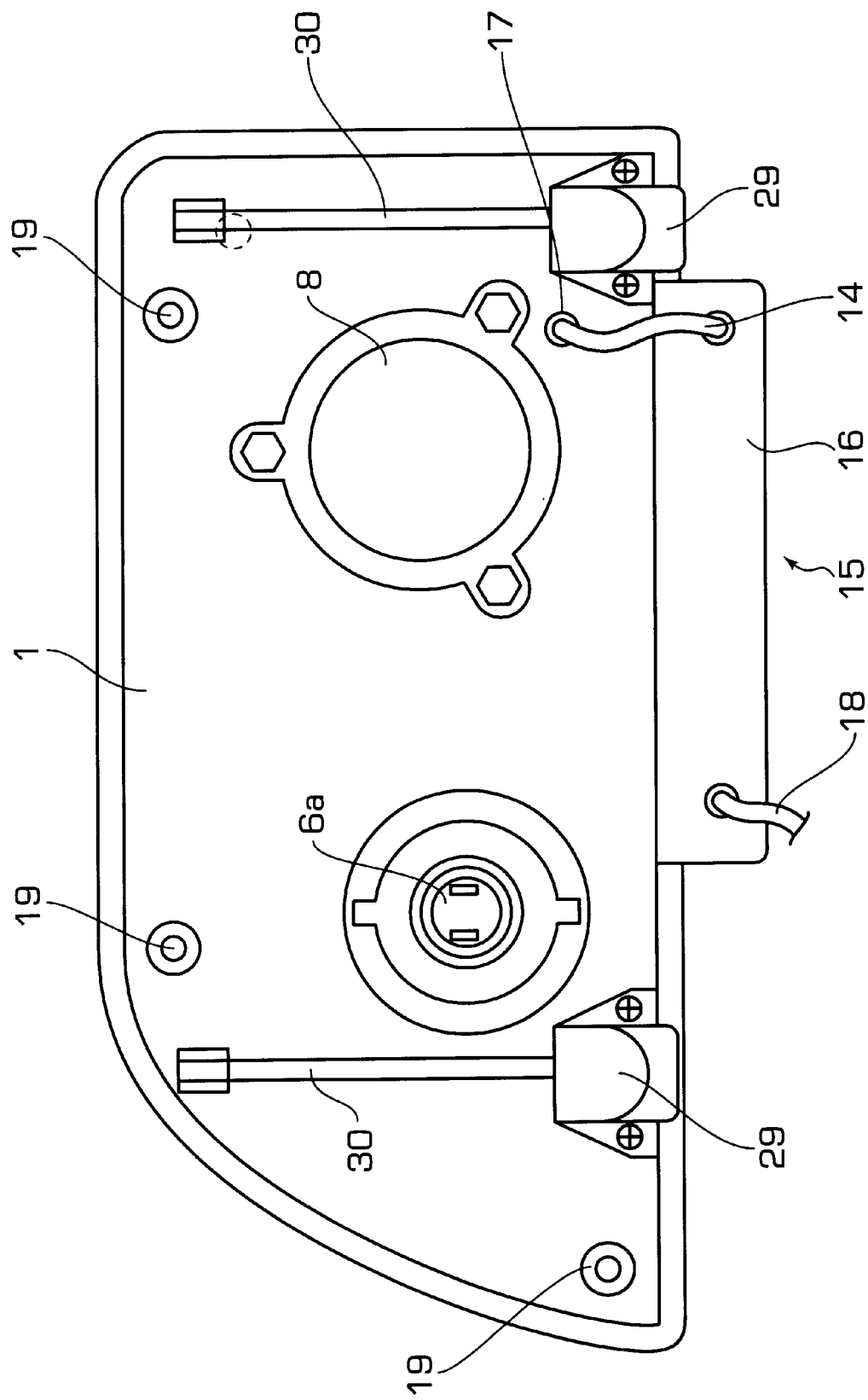
Figure 3:
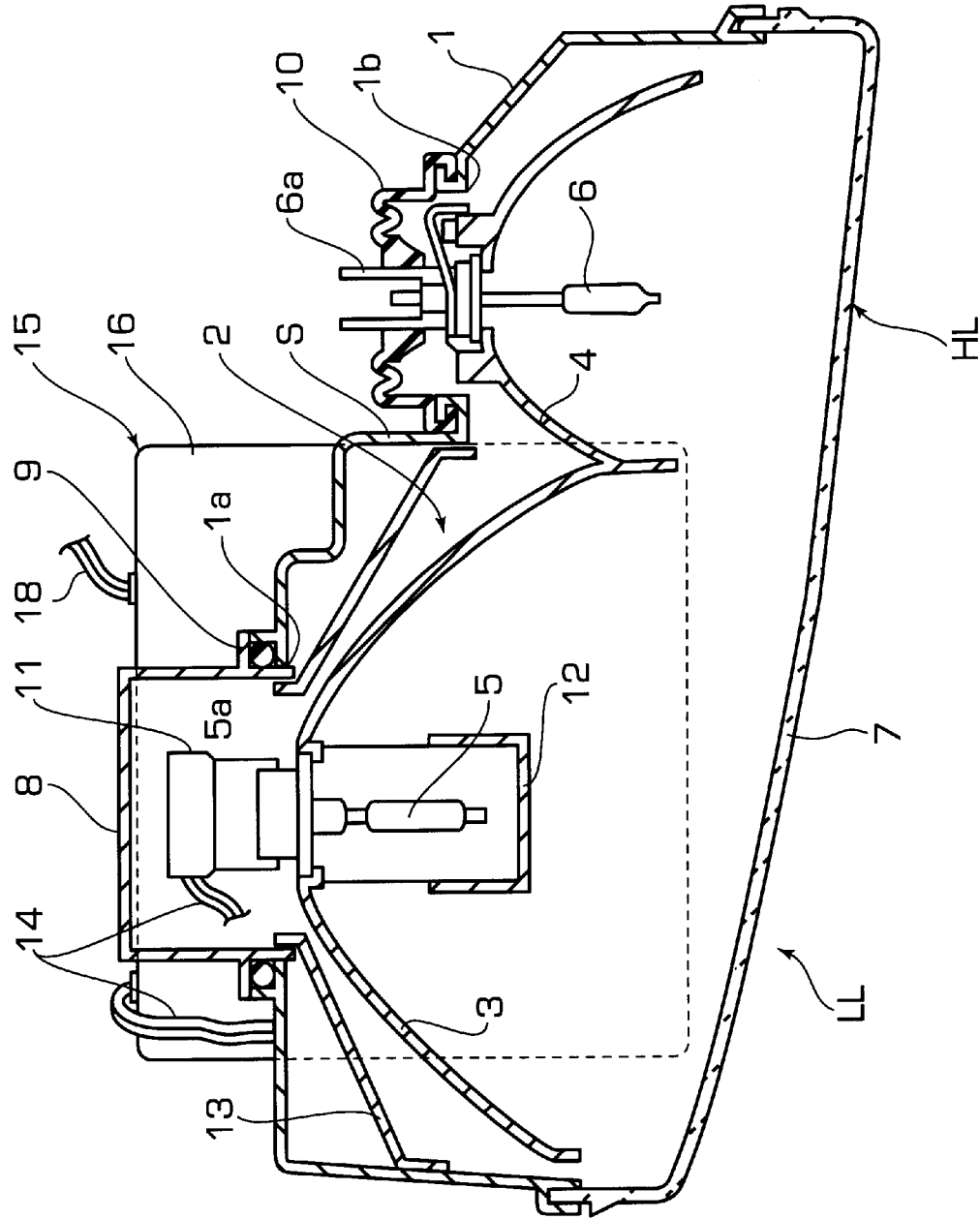
FIGS. 3, 4 and 5 are sectional views taken on lines III—III, IV—IV and V—V, respectively, in FIG. 1.
Figure 4:
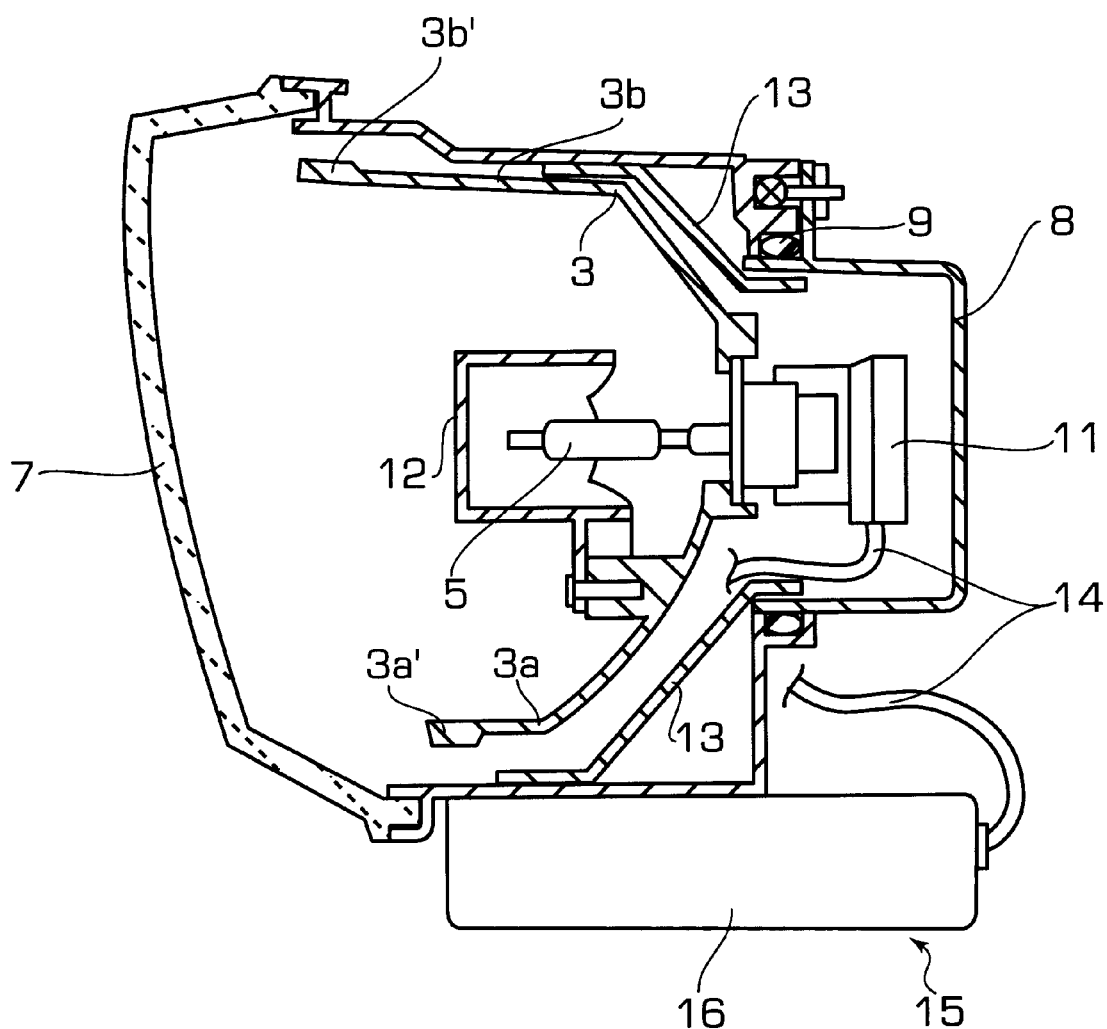
Figure 5:
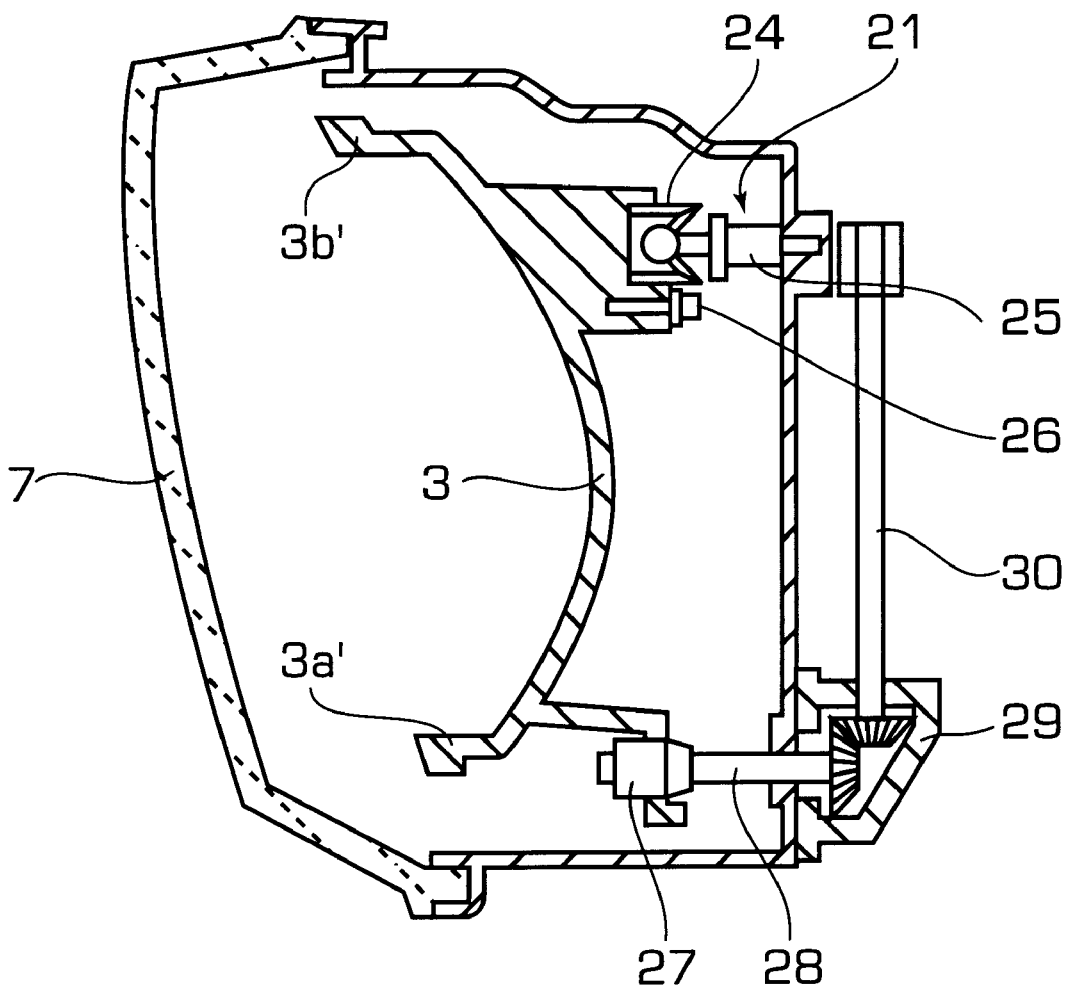

As shown in the drawings, a lighting fixture body 1 has an integral built-in reflector unit 2 having two reflectors 3, 4. When the headlight is mounted on an automobile, a discharge bulb 5 is detachably fitted to the reflector 3 at the side of the fixture providing a passing beam lamp LL which is positioned adjacent to the outer side of an automobile body. An incandescent (e.g., halogen) bulb 6 is also detachably fitted to the reflector 4 to provide a travel beam lamp HL which is positioned inside the lamp LL, i.e., further from the outer side of the automobile body. Further, a lens 7 is fitted in the front opening of the lighting fixture body 1 and the light chambers of the respective lamps LL, HL are separately provided in the lighting fixture body 1. In this case, the shape of the front opening of the lighting fixture body 1 is arranged so that, as shown in FIGS. 4 and 5, the front opening is tilted forward in that the upper portion of the lens 7 is further forward than the lower portion thereof.

Openings 1a, 1b for use in inserting and detaching bulbs are provided in the rear of the lighting fixture body 1. A detachable back cover 8 is fitted in the opening 1a on the side of the passing beam lamp LL via a seal ring 9, whereas a rubber cover 10 is fitted in the opening 1b on the side of the travel beam lamp HL. Thus the openings 1a, 1b are sealed in a waterproof condition. A connector 11 is connected to a socket 5a of the discharge bulb 5 of the passing beam lamp LL, whereas a socket connector 6a of the halogen lamp 6 or the travel beam lamp HL projects outwards from the rubber cover 10 and a connector (not shown) is connected to the socket connector 6a.

Figure 6:
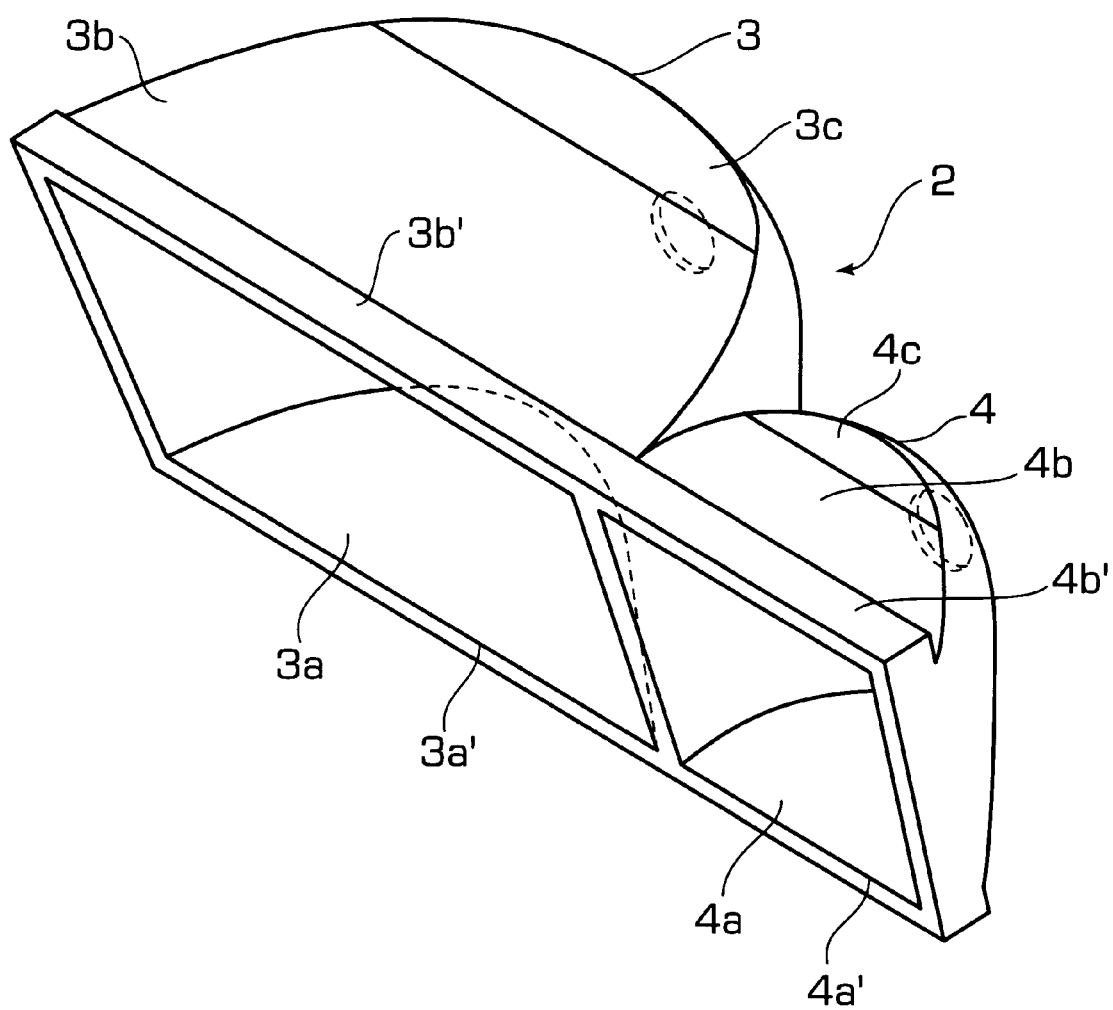
FIG. 6 is a persepctive view of a reflector unit.

Aluminium, for example, is applied to or deposited on the inner face of the reflector unit 2 to form a reflective surface. In this integral type reflector, as shown in the schematic diagram of FIG. 6, the reflector 3 of the passing beam lamp LL and the reflector 4 of the travel beam lamp HL, which is integral with the former, each have rotary parobolic portions 3c, 4c, shaped as partial parabolas of rotation, and flat portions 3a, 4a and 3b, 4b which project forwards on the upper and lower sides of the respective parabolic: portions. Although the front opening positions of the flat portions 3a, 4a and 3b, 4b of the respective reflectors 3, 4 are uniform, the rear positions of the rotary parabolic portions 3c, 4c are not uniform, that is, the rotary parobolic portion 3c of the passing beam lamp LL protrudes by a greater amount than the rotary parabolic portion 4c of the travel beam lamp HL. Therefore, the reflectors 3, 4 whose sectional shapes in the horizontal direction are substantially parabolic are such that the depth dimension of the reflector 3 of the passing beam lamp LL is greater than that of the reflector 4 of the travel beam lamp HL. In other words, the mouth width dimension of the reflector 3 is greater than that of the reflector 4.

Since the lens 7 is tilted forwards as described above, the length of the forward projections of the flat portions 3b, 4b on the upper sides of the respective reflectors is greater than that of the longitudinal projections of the flat portions 3a, 4a on the :Lower sides thereof. Therefore, the areas of the flat portions 3b, 4b on the upper sides of the respective reflectors are greater than those of the flat portions 3a, 4a on the lower sides thereof. Further, the edge portions of the front openings of the reflectors 3, 4, that is, the front edge portions 3a', 4a', 3b', 4b' of the respective flat portions on the aforesaid upper and lower sides are made thicker than the other portions. A shade 12 for obtaining desired light distribution characteristics is integrally supported with the reflector 3 of the passing beam lamp fitted with the discharge bulb 5. As the shade 12 is similar in structure to any conventional one, the description thereof will be omitted.

In order to adjust-the optical axis of a lighting fixture according to this embodiment of the invention, the fulcrum portion 21 of an optical axis adjusting mechanism is provided in a position outside the upper portion of the reflector unit 2. A vertical optical axis adjusting portion 22 is provided in a position right under the fulcrum portion and a lateral optical axis adjusting portion 23 is provided laterally of the fulcrum portion. The fulcrum portion 21 for optical axis adjustment is such. that, as shown in FIG. 5, a pivot socket 24 is integrally fitted to the rear side of the ref lector unit 2 and a pivot stud 25 is provided on the inner face, which is opposite to the pivot socket, of the lighting fixture body 1. Further, a pivot head 26 at the tip of the pivot stud 25 is fitted into the pivot socket 24, so that this structure can be used to tilt the reflector unit 2 vertically and laterally.

The vertical optical axis adjusting portion 22 and the lateral optical axis adjusting portion 23 are each such that, as shown by the vertical optical axis adjusting portion 22 in FIG. 5, an adjusting nut 27 is fitted to the rear side of the reflector unit 2 and an adjusting screw Z8 is longitudinally and pivotally supported with the lighting fixture body 1, the adjusting screw 28 being screwed in the adjusting nut 27. When the adjusting screw 28 is thus pivoted, the position of the adjusting nut 27 varies axially with respect to the adjusting screw 28 and the integral type reflector 2 is vertically (or laterally), tilted with the fulcrum portion 21 as a fulcrum, whereby the optical axis is adjusted. In this embodiment, the adjusting screw 28 is coupled to an optical axis adjusting shaft 30 which is vertically extended by a bevel gear mechanism 29 along the rear side of the lighting fixture body 1. In other words, it is so arranged that the optical axis is adjusted by rotating the optical axis adjusting shaft 30 from the surface outside of the lighting fixture.

Since the depth dimensions of the reflectors 3, 4 of the respective lamps in the lighting fixture body 1 are different, there is also a difference between the position where the rear side of the part of the lighting fixture body 1 for the passing bean lamp LL protrudes backwards and the position where the rear side of the part of the body for the travel beam lamp HL protrudes backwards. Consequently, a stepped portion S is formed between them. Aluminium is also applied to or deposited on the inner face of the lighting fixture body 1, as in the case of the reflector unit 2, and the inner face thereof is utilized as not only part of a reflective surface but also a shielding film for electromagnetically shielding the interior of the lighting fixture body 1. Further, a conductive material or a metal plate, bent into a shielding plate 13 so as to surround an area on the rear side of the discharge bulb 5, is bonded or fixed to the inner face of the lighting fixture body 1 with screws. Moreover, stud bolts for fixing the headlight to the body of an automobile are provided on the rear side of the lighting fixture body 1.

As noted previously, the connector 11 is fitted to the socket 5a of the discharge bulb 5 and a lead 14 connected to the connector 11 is connected to a lighting circuit 15 fitted to the exterior or the lighting fixture body 1. The lighting circuit 15 has a low-voltage circuit portion which is driven by the voltage supplied by a car battery and a starter circuit portion for generating a high voltage from the output voltage of the low-voltage circuit portion, which high voltage is used for lighting the discharge bulb 5. These circuit portions are integrally contained in a metal lighting circuit case 16. The lighting circuit case 16 is securely fitted to the underside or the part of the passing beam lamp LL of the lighting fixture body 1 with a bracket or screws (not shown). More specifically, the depth dimension and the mouth width dimension of the reflector 3 are made large enough to correspond to the enlarged planar dimension or the lighting circuit case 16, which is fitted to the enlarged underside of the area of the lighting fixture body 1 right below the passing beam lamp LL.

The lead 14 used to connect electrically the lighting circuit 15 and the discharge bulb 5 passes out of the lighting circuit case 16 and enters in the lighting fixture body through an insert hole 17 in the rear of the lighting fixture body right above the lighting circuit case 16. The tip end of the lead 14 is then connected to the connector 11, which is fitted in the socket 5a of the discharge bulb 5. Further, a power supply lead 18 to be connected to the car battery passes out of the lighting circuit case 16.

The reflective area of the reflector 3 in the headlight thus arranged is made large since the mouth opening area at the front of the reflector 3 is made greater than the opening area of the reflector 4 by causing the rotary parabolic portion 3c of the reflector 3 of the passing beam lamp LL to protrude backwards further than the rotary parabolic portion 4c of the reflector 4 of the travel beam lamp HL. Of the light emitted from the discharge bulb 5, the light directed in the upper forward direction is shielded by the shade 12 for preventing dazzle, whereas the light directed in the lower, side and rear directions is projected onto the reflector 3. The effective reflective area of the reflector 3 is thus increased whereby the amount of light irradiated from the passing beam lamp LL, whose frequency in use is high during traveling in urban districts, can be maintained high. Thus the visibility is improved and this is desirous in view of traffic safety.

The heat generated from the discharge bulb 5 is more intense than what is generated from the incandescent bulb 6, and the flat portions 3a, 3b on the lower and upper sides of the reflector 3 are heated by the heat generation of the discharge bulb 5 more than the reflector 4 is heated by the incandescent bulb 6. Therefore, the heat is effectively radiated by the larger areas of the flat portions 3a, 4a. Although air is heated by the heat thus generated and projected onto the upper flat portion 3b, effective heat radiation is also possible even in this case because the area of the upper flat portion 3b of the reflector is greater than that of the lower flat portion 3a. Further, the wall thickness of the opening edge portions 3a', 3b' in the upper and lower flat portions 3a, 3b is greater than that of the remaining portion and this greater mechanical strength prevents the reflector from being deformed even when each of the flat portions is heated, thus contributing to improving resistance to heat distortion. The heat radiating property and the resistance to heat distortion are similarly provided for the reflector 4 of the incandescent bulb 6.

Since the case 16 containing the lighting circuit 15 including heavy parts is fitted to the underside of the lighting fixture body 1, the weight balance of the whole lighting fixture can be stabilized. Particularly since the lighting circuit case 16 is fitted to the large underside area of the lighting fixture body 1 right below the passing beam lamp LL, a large area is allocated to a place where the lighting circuit case 16 is arranged, so that the lighting circuit case 16 is stably fitted thereto. The large planar area of the lighting circuit case 16 makes it possible to secure the same volume with reduced height. Thus the amount of downward protrusion of the lighting fixture body 1 is small.

Further, the lighting circuit itself is shielded by the metal case 16 and consequently no electromagnetic waves leak out of the lighting circuit 15. Moreover, the lead 14 from the case 16 enters in the lighting fixture body 1 through the hole formed extremely close to the case 16, whereby electromagnetic waves are restrained from being radiated from the lead. Further, the electromagnetic waves from the lead 14 within the lighting fixture body 1 are shielded by the aluminium shielding film provided on the inner face of the lighting fixture body 1 and the shielding plate 13. Thus the radiation of the electromagnetic waves from the lighting fixture body 1 is prevented.

Figure 7:
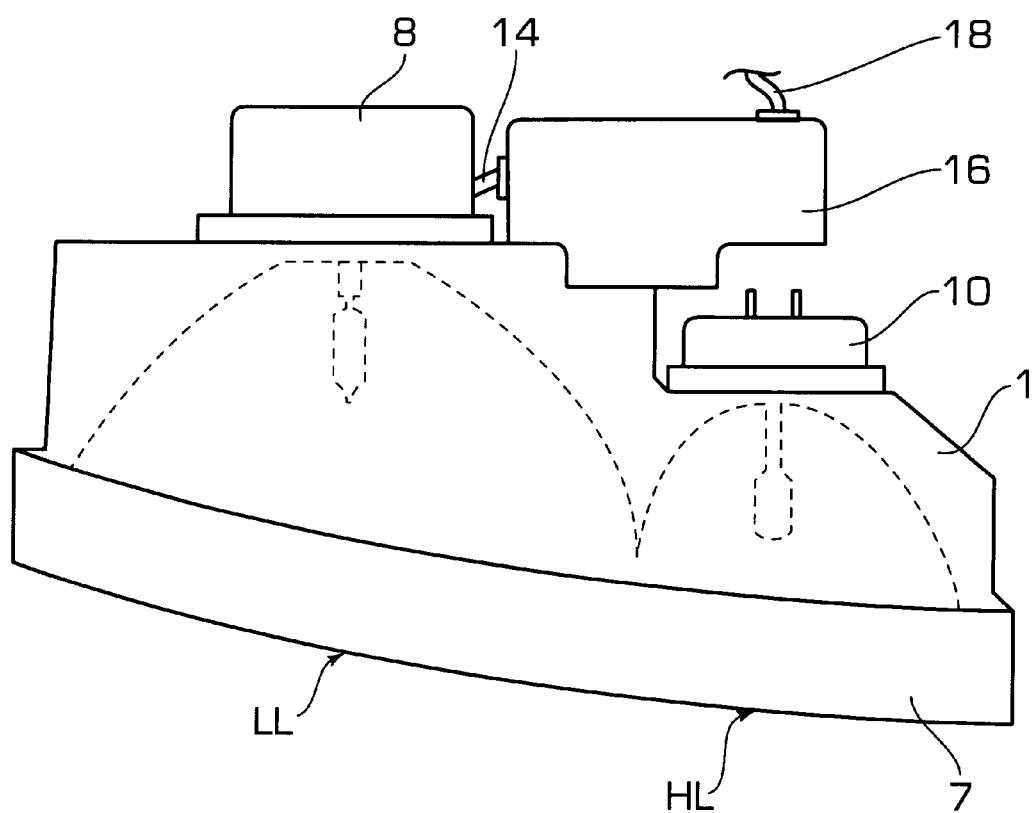
FIG. 7 is a plan of another embodiment.

Although the lighting circuit 15, that is the lighting circuit case 16, is fitted to the underside of the lighting fixture body 1 right below the passing beam lamp LL according to the preceding embodiment of the invention, the lighting circuit case 16 may be fitted to the rear of the part of the lighting fixture body 1 right behind the lamp having the incandescent bulb, that is, the travel beam lamp HL whose reflector has a short depth dimension. This i6 shown in FIG. 7. In this case, the lighting circuit case 16 is formed so that its external dimensions correspond to those of a recess resulting from the stopped portion s formed on the rear side of the lighting fixture body 1 between the travel beam lamp HL and the passing beam lamp LL. Then the lighting circuit case 16 is fitted in the recess in order to reduce the protrusion of the circuit case portion from the lighting Fixture body 1 as much as possible and this is advantageous in that the lighting circuit case 16 is readily fitted to the body of an automobile. Moreover, an increase in the height dimension of the whole lighting fixture is avoided in comparison with a case in which the lighting circuit case 16 is fitted to the underside of the lighting fixture body. Thus the lighting fixture may effectively be made more compact.

A discharge bulb has been employed as the light source or the passing beam lamp according to the above embodiments. The discharge bulb generally has properties of great luminance and a long life. Therefore, a discharge bulb may be used for the travel beam lamp HL when the present invention is applied to headlights of large sized automobiles, particularly such as trucks with greater frequency of night travelling in the suburbs and greater frequency of use of travel beam lamps.

As set forth above, the depth dimension and the mouth opening with dimension of the reflector for the lamp having the discharge bulb are made greater than those of the reflector for the lamp having the incandescent bulb with the effect of increasing the light reflection efficiency of the reflector for the lamp having the discharge bulb and maximising the light emitting performance of the discharge bulb to ensure that a vehicular lighting fixture with such a headlight offers excellent visibility. Further, the heat-radiating property is increased by making the flat portion on the upper side of the reflector greater than that on the lower side thereof, and the resistance of heat distortion is improved by increasing the wall thickness of the edge portion of the opening. Moreover, the provision of the lighting circuit right below the lamp having the discharge bulb or at the rear of the lamp having the incandescent bulb results in increasing the stability of the lighting fixture and reducing the size thereof. Further, the provision of the conductive shield plate has the effect of suppressing electromagnetic waves from being radiated out of the lighting fixture.

What is claimed is:

1. A vehicular lighting fixture comprising a first lamp having a discharge bulb for generating a low beam and formed integrally with a second lamp having an incandescent bulb for generating a high beam, wherein a depth of a first reflector for the first lamp in a first direction from a front of a vehicle in which the fixture is mounted to a rear of the vehicle is greater than a depth of a second reflector for the second lamp in said first direction, and a width of a front opening of the first reflector in a second direction from one side of the vehicle to an opposite side is greater than a width of a front opening of the second reflector in said second direction.

2. A vehicular lighting fixture according to claim 1, wherein the first lamp and the second lamp are installed in a single lighting fixture body, and a lighting circuit for use in lighting the discharge bulb is arranged directly beneath the first lamp on a flat portion of an underside of the lighting fixture body in a third direction substantially transverse to said first and second directions.

3. A vehicular lighting fixture according to claim 1, wherein the first lamp and the second lamp are installed in a single lighting fixture body, and a lighting circuit for use in lighting the discharge bulb is arranged on a rear surface of the lighting fixture body behind the second lamp in said first direction.

4. A vehicular lighting fixture according to claim 1, further comprising a lighting fixture body in which the first and second lamp are installed, and a shielding plate made of conductive material and surrounding the discharge bulb, wherein said shielding plate is disposed between said first reflector and said lighting fixture body.

5. A vehicular lighting fixture according to claim 1, wherein a thick edge portion is formed at the front opening of the first and second reflectors.

6. A vehicular lighting fixture according to claim 1, wherein a lens is provided in front of the lamps in said first direction, and the lens is tilted so that an upper portion of the lens is positioned forward in said first direction further than a lower portion of the lens, and wherein the first and second reflectors are both positioned so that a front upper edge portion of the first and second reflectors projects forwards in said first direction further than a lower edge portion of said first and second reflectors.

7. A vehicular lighting fixture comprising a first lamp having a discharge bulb and formed integrally with a second lamp having an incandescent bulb, wherein a depth of a first reflector for the first lamp in a first direction from a front of a vehicle in which the fixture is mounted to a rear of the vehicle is greater than a depth of a second reflector for the second lamp in said first direction, and a width of a front opening of the first reflector in a second direction from one side of the vehicle to an opposite side is greater than a width of a front opening of the second reflector in said second direction, further comprising a lighting fixture body in which the first and second lamp are installed, and a shielding plate made of conductive materials and surrounding the discharge bulb, wherein said shielding plate is disposed between said first reflector and said lighting fixture body.

8. A vehicular lighting fixture comprising a first lamp having a discharge bulb and formed integrally with a second lamp having an incandescent bulb, wherein a depth of a first reflector for the first lamp in a first direction from a front of a vehicle in which the fixture is mounted to a rear of the vehicle is greater than a depth of a second reflector for the second lamp in said first direction, and a width of a front opening of the first reflector in a second direction from one side of the vehicle to an opposite side is greater than a width of a front opening of the second reflector in said second direction, wherein the first lamp and the second lamp are installed in a single lighting fixture body, and a lighting circuit for use in lighting the discharge bulb is arranged directly beneath the first lamp on a flat portion of an underside of the lighting fixture body in a third direction substantially transverse to said first and second directions.

* * * * *